United States Patent
Kragh et al.

(10) Patent No.: US 7,082,590 B2
(45) Date of Patent: Jul. 25, 2006

(54) THREE-DIMENSIONAL WIRE HARNESS ASSEMBLY MODELS FROM THREE-DIMENSIONAL ZONE MODELS

(75) Inventors: Edwin C. Kragh, Bellevue, WA (US); Joel W. Storckman, Seattle, WA (US); Paul E. Shappell, Elkton, MD (US)

(73) Assignee: The Boeing Company, Chicago, IL (US)

( * ) Notice: Subject to any disclaimer, the term of this patent is extended or adjusted under 35 U.S.C. 154(b) by 195 days.

(21) Appl. No.: 10/692,236

(22) Filed: Oct. 23, 2003

(65) Prior Publication Data

US 2005/0091628 A1 Apr. 28, 2005

(51) Int. Cl.
*G06F 17/50* (2006.01)
(52) U.S. Cl. .............................. 716/13; 716/12; 716/14; 716/15
(58) Field of Classification Search ............ 716/12–15; 700/17, 97, 83, 96, 115, 116–117, 213; 29/825, 29/851, 857, 861, 866, 867, 747, 748
See application file for complete search history.

(56) References Cited

U.S. PATENT DOCUMENTS

| 5,083,369 | A | 1/1992 | Cerda |
| 5,109,479 | A | 4/1992 | Williams |
| 5,127,062 | A | 6/1992 | Cerda |
| 5,506,950 | A | 4/1996 | Hughes et al. |
| 6,438,435 | B1 | 8/2002 | Wada et al. |
| 6,457,165 | B1* | 9/2002 | Ishikawa et al. ............... 716/12 |
| 6,530,677 | B1 | 3/2003 | Mori et al. |
| 6,694,203 | B1 | 2/2004 | Wada et al. |
| 2003/0050723 | A1* | 3/2003 | Ozaki ........................... 700/97 |

* cited by examiner

*Primary Examiner*—Vuthe Siek
(74) *Attorney, Agent, or Firm*—Lee & Hayes, PLLC

(57) ABSTRACT

Methods and computer-readable media for designing a wiring harness assembly are provided. Wiring data is automatically extracted from wiring harness installation models for a plurality of zones of the system. Wiring connections between the wiring harness installation models are reconciled. At least one wiring harness assembly model is automatically generated from the wiring harness data extracted from the wiring harness installation models.

52 Claims, 2 Drawing Sheets

THREE-DIMENSIONAL WIRE HARNESS ASSEMBLY MODELS FROM THREE-DIMENSIONAL ZONE MODELS

FIELD OF THE INVENTION

This invention relates generally to computer-aided design and, more specifically, to computer-aided design of wiring systems.

BACKGROUND OF THE INVENTION

Designing wiring assemblies for vehicles and other complex systems is a very difficult undertaking. Even a reasonably simple automobile has dozens of interconnected electrical subsystems, each of which may involve dozens of wires interconnecting sensors at various points in the engine with monitoring and control modules. The wiring assemblies must be suited to meet their objectives: there must be enough individual connectors, individual wires have to have sufficient length between connections, wires must have the performance capability to communicate signals or handle sufficient loads, and other characteristics.

In the case of larger and more complex systems, such as an aircraft, the concerns are greater. Today's aircraft tend to replace mechanical or hydraulic systems with electrical systems, resulting in more complex wiring systems. At the same time, additional electrical systems are used in contemporary aircraft which further multiply the number and complexity of wiring systems. To make design and fabrication of such craft feasible, the aircraft is subdivided into areas or zones. By developing one zone at a time, the huge engineering task of creating a sophisticated aircraft can be rendered manageable. To interconnect electrical subsystems within each zone, three-dimensional wiring harness installation (WHI) models are completed for each zone of the aircraft.

WHI models suitably provide for the interconnection of electrical subsystems within each zone and open connections for subsystems in zones throughout the aircraft. Wiring harness assemblies (WHA) must be fabricated according to the WHI models to interconnect subsystems throughout the aircraft. However, WHI models do not generate the design of WHAs needed to interconnect subsystems between different zones of the aircraft. Unfortunately, to provide for the eventual interconnection of the subsystems, generalized wiring harnesses are installed throughout the aircraft to—hopefully—accommodate interconnection of the subsystems between zones.

By analogy, installing such generalized wiring harnesses and then using them to interconnect the subsystems as they are designed and installed is like wiring a house without knowing what types of outlets and capacities would be needed in each room. Testing the circuits could be compared with flipping circuit breakers in the basement of the symbolic house and hoping that the lights would come on in the correct rooms of the house. If there were to be a problem, with the wiring in the symbolic house, the wiring would have to be removed and new wiring installed. By installing wiring harnesses to attempt to anticipate the development of the subsystems in the different zones in an aircraft, the possibility of error, cumbersomeness of testing, and ordeal of making changes is comparable to such an ill-conceived speculative wiring of the house.

Proper creation of each WHA would require access to accurate, current centerline data from numerous different WHI models. Conventionally, this is a manual process. To create a WHA, the WHA designer first determines which WHI models are needed then combine the centerline data from the identified WHI models into a single WHA model. The WHA model is then delivered to a fabrication group that derives the wiring-related data elements needed to create the WHA and create the unique as-fabricated depiction of the WHA commonly referred to as a formboard, jigboard, or nailboard. The formboard is used to actually create the WHA.

Because creation of the WHA model depends on completion of the WHI models, creation of the WHA models typically occurs at the end of the overall system design cycle. Because fabrication of the formboard to create the WHAs necessarily follows whatever time is needed to create the WHA models, creation of the WHA model can result in a delay of the entire project.

Thus, there is an unmet need in the art for improving the labor-intensive process of determining which WHI models are of interest, creating the WHA model, preparing the data elements, and creating the WHA formboard.

SUMMARY OF THE INVENTION

The present invention provides a method, computer-readable medium, and system for improving the creation of wiring harness assemblies (WHAs). Data needed for creation of WHAs is automatically extracted from wiring harness installation (WHI) models. As a result, needed data is available without manual re-keying, thereby avoiding data entry errors. The data is automatically analyzed and connections are automatically resolved when possible. The rest are presented to the user for disposition or correction. The WHI data elements are used to create one or more WHA models. The WHA is presented in a two-dimensional, "flattened out" view to show dimensions and a data list of the specifications of the WHA to interface with the wiring system. The flattened-out, as-fabricated view can be used as a formboard for creation of wiring harnesses. Extraction and modeling of the WHAs according to this process improves WHA creation by significantly reducing cycle time and greatly reducing errors.

More specifically, embodiments of the present invention provide methods and computer-readable media for designing a wiring harness assembly for a system. Wiring data is automatically extracted from wiring harness installation models for a plurality of zones of the system. Wiring connections between the wiring harness installation models are reconciled. At least one wiring harness assembly model is automatically generated from the wiring harness data extracted from the wiring harness installation models.

In accordance with other aspects of the present invention, the wiring harness installation models may be created in a computer aided three-dimensional interactive application that generates the wiring data in a standard data format such as standard for the exchange of product (STEP) model data and initial graphics exchange specification (IGES).

In accordance with further aspects of the present invention, reconciling of wiring connections may be performed automatically by correlating wiring data extracted from the wiring harness installation models. A reconciling parameter list customizable by a user is incorporated in the automatic reconciliation process. The parameter list includes at least one of a project designation, a change number, a trapping tolerance, an association tolerance, a number of chaining iterations, a break model at junctions option, a generate automatic identifiers option, a continuation point analysis option, and a separate layers bundling option. Potential wiring inconsistencies also can be resolved manually by a user.

In accordance with still other aspects of the present invention, one or more wiring harness assemblies may be generated in the form of a two-dimensional model of the wiring harness assembly. A number of steps allow a user to specify how the two-dimensional model of the WHA will be created.

In accordance with additional aspects of the invention, a processing report describing the generating of the wiring harness assembly model may be generated. The processing report is generated according to a report parameter list customizable by a user.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to methods and computer-readable media for designing wiring harness assemblies. Many specific details of certain embodiments of the invention are set forth in the following description and in FIGS. 1–2 to provide a thorough understanding of such embodiments. One skilled in the art, however, will understand that the present invention may have additional embodiments, or that the present invention may be practiced without several of the details described in the following description.

By way of overview, embodiments of the present invention provide methods and computer-readable media for designing a wiring harness assembly for a system. Wiring data is automatically extracted from wiring harness installation models for a plurality of zones of the system. Wiring connections between the wiring harness installation models are reconciled. At least one wiring harness assembly model is automatically generated from the wiring harness data extracted from the wiring harness installation models.

Embodiments of the present invention suitably take the form of a software package configured to interact with a CATIA software program, specifically CATIA Version 4. The CATIA software program is used to create the wiring harness installation (WHI) model for each of the separate subsystems to be integrated into the overall system. The CATIA software program generates data for the individual WHI models that are used by embodiments of the present invention to create wiring harness assemblies (WHAs).

Figure 1:
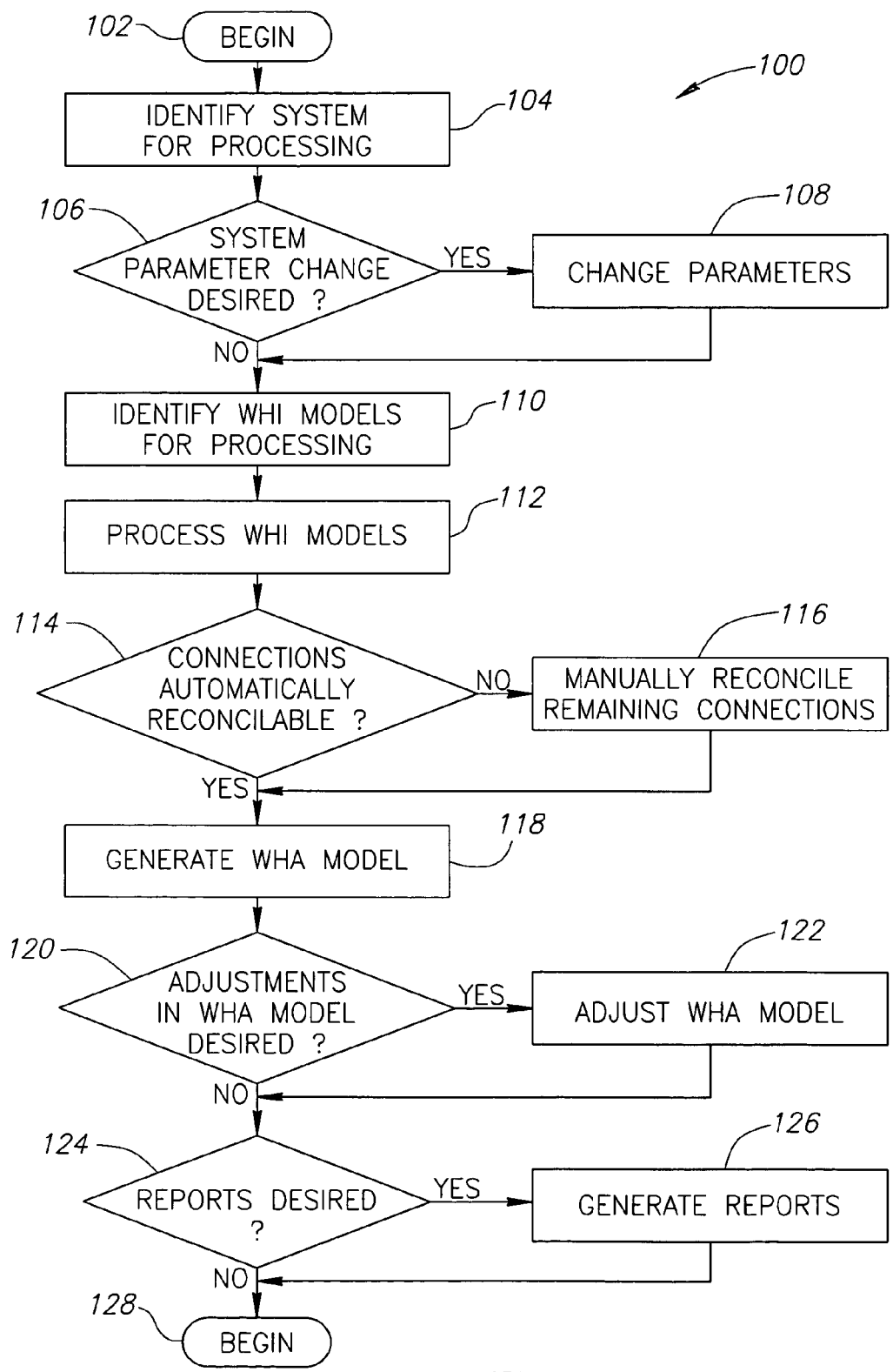
FIG. 1 is a flowchart of a routine according to an embodiment of the present invention.

FIG. 1 is a block diagram of a routine 100 according to an embodiment of the present invention which may be manifested in a software program. Additional details regarding the operation of the routine 100 are presented in connection with FIG. 2 detailing operation of instructions stored on a computer-readable medium to perform the routine 100.

The routine 100 begins at a block 102 and continues at a block 104 where a user identifies the overall system for which WHAs are desired. With the overall system input, at the block 104, the routine 100 can access information about the subsystems for which WHI models exist to determine relative position of the subsystems. This information is useful in developing the WHA models, as will be described further below.

At a decision block 106 it is determined if system parameter changes are desired. Upon the user identifying the overall system for which the WHA models are desired, certain default routine parameters are preset. These parameters suitably include not only the system designation, such as an aircraft model, but other parameters such as tolerances, how WHA bundles should be layered, and other parameters that will be further described below. If it is determined that there is a desire to change the parameters the user can change the parameters at a block 108.

If it is determined that it is not desirable to change the parameters or once the desired parameters have been changed, at a block 110 the WHI models for and between which WHAs are desired are identified. At a block 112 the WHI models are processed to extract wiring data desired for creation of the WHA and the interconnections between the WHI models are reconciled. To reconcile the WHI models, a plurality of aspects of the WHI models are interrogated. For example, WHI models are examined for points with WHA identifiers that are greater than the trapping distance from a harness centerline element, typically a space curve. Points not meeting requirements are moved to a workable point to be on the curve. Similarly, WHI models are examined for curves that are not broken at the junction of three or more curves. As needed, the routine will break the curve at the junction of three or more curves. WHI models also are examined for wire harness centerline curves or lines which are exact duplicates of one another. All such instances discovered will be deleted from the WHI model. Wiring connections having lengths too short to be valid, such as less than 0.005 inches in length, are deleted. Similarly, wiring segments too long to be accommodated in the model automatically are removed. Automatically reconcilable discrepancies are handled for the user.

At a decision block 114 it is determined if all connections are reconcilable according to the overall system information and WHI model information. A number of connections are not necessarily automatically resolvable. For example, continuation points that do not correspond to a continuation point in an adjacent model will be presented to the user for evaluation and reconciliation. Similarly, points identified as continuation points but that are not at the segment end point are presented to the user for evaluation and correction. Curves or lines that overlap will not provide the continuous curve needed to flatten the WHA. Conditions where wiring connections overlap and cannot automatically be reconciled are presented for the user to correct them manually. WHI models having three-dimensional text that does not match the point identifier text is highlighted for the user to re-identify or remove. At a block 116 the user is given the opportunity to manually reconcile the connections or correct underlying errors which rendered the connections irreconcilable.

Once the interconnections are resolved, at a block 118 each of the WHA models is "flattened" to reduce them to a two-dimensional build plan. In one presently preferred embodiment, the two-dimensional build plan is a formboard which can be used to create WHAs. At a decision block 120 it is determined if changes are desired in the WHA models. If so, desired changes in the WHA model are made at a block 122. If no changes are desired or once desired changes have been made, at a decision block 124 it is determined if reports are desired concerning the WHA model generated. If so, at a block 126 the desired reports are generated. If no reports are desired or once the desired reports have been generated, the routine 100 ends at a block 128.

Figure 2:
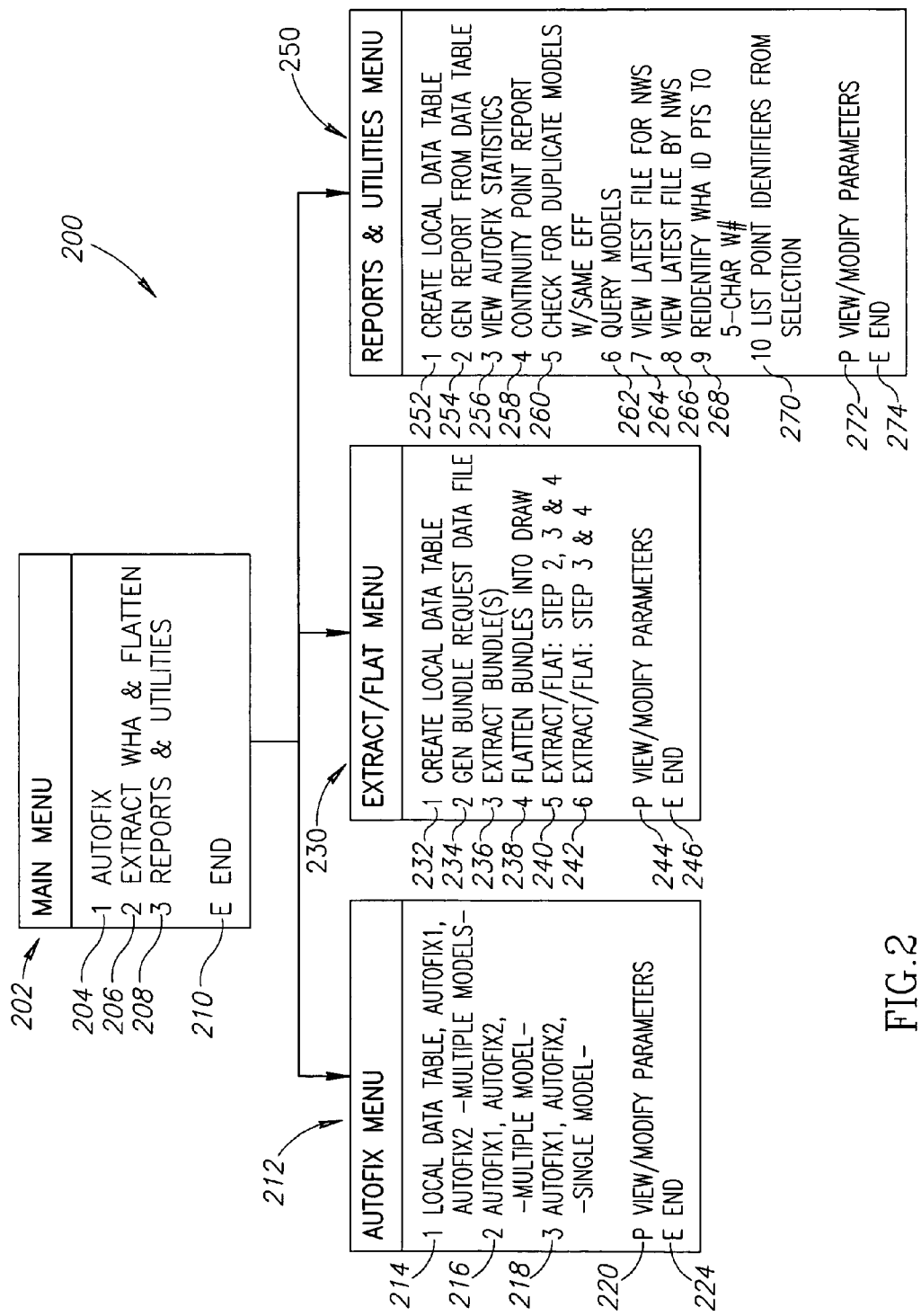
FIG. 2 is a control diagram for a computer-readable medium having stored thereon instructions for processing WHI models to generate WHA models according to an embodiment of the present invention.

FIG. 2 is a control diagram 200 for a computer-readable medium having stored thereon instructions for processing WHI models to generate WHA models according to an embodiment of the present invention. At a main menu 202, a user is given options 204, 206, and 208 to enable generation of desired WHA models plus an end option 210 to exit the routine 200.

Selecting the first "autofix" option 204 allows the user to reconcile WHI model data to help create the WHA. The autofix option 204 is used to identify elements in the WHI models that are inconsistent with modeling standards for creating WHA models and thus potentially will cause problems for the flatten routines as previously described in connection with the extraction and reconciliation block 112 of the routine 100 (FIG. 1). The autofix option 204 provides the ability to check the data elements of a single WHI model or multiple WHI models.

Selecting the autofix option 204 presents the user with an autofix menu 212 presenting the user with another series of three options 214, 216, and 218, plus a parameters 220 to allow the user to provide, verify, or modify parameters and an autofix end option 222. Prior to running a routine to reconcile the WHI models, a parameters option 220 is used to verify that the routine will operate according to the parameters reflecting desires of the user. The parameters are explained below.

Choosing the local data table option 214 creates a local data table for the storage of wiring data and causes WHI Model problems and inconsistencies to be identified and either automatically reconciled or manually corrected by the user. More specifically, the local data option 214 creates a "tool model" for review by the user with each automatically irreconcilable aspect of a WHI model highlighted. In one presently preferred embodiment, aspects left for the user to reconcile in the tool model are labeled with colored markers, each of which represents a particular problem, such as unresolved continuation points or overlap conditions as previously described. Such colored markings call the user's attention to the conditions that must be reconciled and specifically the element and the condition to be reconciled. The tool model is a temporary file which the user should delete once the user has completed manual reconciliation of the discrepancies.

If a local data table already has been created, the user can select the autofix multiple model option 216 or the autofix single model option 218. The autofix multiple model option 216 is used to multiple potential WHA models. The autofix single model option 218 generates a single WHA model.

To allow for flexibility in creation of WHA models, a user can verify and/or change several different parameters involved in creation of the WHA models. The user can verify or enter the overall system for which the WHAs is being designed. For example, if the overall system is an aircraft, the user can verify or identify the aircraft for which the WHA is being designed. The user can specify the overall system or aircraft by selecting an appropriate CATIA model to be used in further processing. In addition, a user can set spacing tolerances to set the acceptable distances between path segments. As desired, a user can identify whether WHA models should be divided at junctions in the overall system, or whether bundles of wires in the WHA assembly should be bundled together or on separate levels. The ability to enter these preferences as input to the model generation process allows significant user control in the generation process without the user having to manually develop the WHA model to ensure that the user's preferences are regarded in the creation of the WHA model.

Once the autofix option 204 has been executed, from the main menu 202 the user can select the extract WHA and flatten option 206. The extract WHA and flatten option 206 generates a WHA model from the reconciled wiring data requirements previously generated. A data table generated from the WHI models that will be connected by the WHAs of interest must be active. A bundle request listing the WHI models used in building the WHA model is specified by the user. In one presently preferred embodiment, multiple WHA models can be extracted at one time. The WHA model or models extracted are saved in a data file for review by the user if desired or necessary.

In one presently preferred embodiment, the WHA model identifies wiring segments of different types by presenting them in different colors, each of which represents a type of wiring segment. For example, white segments are identified segments found in the WHI. Red segments are chained segments interconnecting two white segments. Yellow segments are closed loop segments. Models with closed loop segments will not flatten to a WHA models, and the user is charged with resolving the conflict to permit completion of the WHA model.

The WHA models are flattened one by one until complete and presented as an as-fabricated or "as-fabbed" two-dimensional view or formboard. Each of the resulting WHA models will include specifications such as length, flagmarkers, connector clocking, and term code for ribbon WHAs.

Referring to the Extract/Flatten Menu 230 (FIG. 2), first a local data table 232 is described for the flattened WHA model. The designation of the overall system, such as the aircraft model and the data table type need to be verified. A generate bundle request option 234 allows the user to identify a single desired WHA of interest or a list of desired WHAs. In one presently preferred embodiment, a bundle request data file will be displayed that lists the WHIs that will be used to create each WHA in the bundle request list and the model name under which the WHA will be created.

Selecting the extract bundle(s) option 236 causes all the data needed for the creation of the WHAs to be extracted from the WHI models for the desired WHAs identified in the generate bundle request option 234. The flatten bundles into DRAW space option 238 causes the extracted data to be used to generate the an as-fabbed view or formboard model in a two-dimensional representation. A successful WHA flatten will generate a WHA model that includes length, flagmarkers, connector clocking, and term code for ribbon WHAs.

In one presently preferred embodiment of the invention, shortcuts can be included to expedite creation of the WHA. For example, once the user has identified WHAs of interest, the user can choose the extract/flat: steps 2, 3, & 4 option 240 to collectively generate the bundle request data file, extract the bundles, and flatten the bundles, thereby collectively performing options 234, 236, and 238. Similarly, should the user desire to adjust the generate bundle request data file option 234, the user can save steps by choosing the extract/flat: steps 3 & 4 option 242.

In one presently preferred embodiment, the user also has a view/modify parameters option 244 to adjust relevant attributes for the generation of the WHA. The user can update the overall system model, such as the aircraft model. The user can adjust parameters affecting the resulting WHA model, including the number of chaining iterations permitted in the WHA, whether to attempt to break the WHA model at junctions, tolerance for rounding dimensions, trapping tolerances, and association tolerances. The user also can adjust various formatting options affecting the appearance and storage of output of the process. Once the user has completed the process, the user can select the end option 246.

In one presently preferred embodiment the user can use a workflow management tools menu 250. The workflow management tools menu 250 provides a user with the ability to search data and create reports on WHI data to determine whether WHI data is sufficiently complete to extract WHA models or, in the alternative, how close the WHI data is to being sufficiently complete.

As with other aspects of the system 200, a first option is to specify the nature of the report to be generated with a create local data table option 252. The user can specify or verify the overall system for which the WHA is being generated, such as the aircraft model. If the user already has entered the data sought by the create local data table option 252, the user can skip ahead to the generate report from data table option 254 to generate report without having to again specify the information. The generate report from data table option 254 is a general-purpose search engine operable to search the WHI data for many types of information. For example, the WHI data can be searched by engineer's name to determine his or her progress in generating and/or completing WHI data for his or her portion of the project. Also, the WHI data can be searched by aircraft effectivity to determine how complete the data is for a particular aircraft. The WHI data also can be searched for a particular equipment designator name to find its location on the aircraft, with which aircraft the designator name is used, and when it first was used. Using the generate report from data option 254, the WHI data also can be searched to verify which WHI models were used, or would be used, to create any WHA model. From these examples, it can be appreciated that the generate report from data option 254 tool is advantageous in allowing designers to avoid having to manually search through dozens or hundreds of CAD models.

The user can then select the view autofix statistics option 256 to display the statistical results of the WHI conditions. The view autofix statistics option 256 allows for analysis for all or a portion of an aircraft and is operable to report a number of reconciliations to be made before a successful WHA model extraction can be performed. The view autofix statistics option 256 thereby advantageously allows for determination of man-hours required to complete the project for workflow planning and other purposes. The continuity report option 258 is similar to the view autofix statistics option 256, but the continuity report option 258 is directed to examining inter-model connections rather than the intra-model connections examined using the view autofix statistics option 256.

The check for duplicate models with equivalent effectivity option 260 can be used to search for potential errors in tagging models with effectivity information. For example, a WHI model may be initially valid for aircraft designated 1–10. Later, if a new version of the model is submitted that applies only to aircraft 9–10, there should be one model tagged for aircraft 1–8 and another for aircraft 9–10. However, if a procedural mistake is made, the first model could remain tagged for 1–10 while the revised model is tagged for 109–110, thus there would exist two models tagged to define the same aircraft. The equivalent effectivity option 260 searches for and reports on any/all such mistakes, giving a workflow manager the ability to instantly see problems anywhere in the airplane definition, instead of waiting until the wire shop notices a wire bundle doesn't fit in the airplane because it was manufactured based on an old, superseded WHI model that may have been previously stored.

The query report option 262 is comparable to the generate report from data table option 254 with the exception that it initiates a search of a set of CAD models rather than just search the text-based data table searched by the generate report from data table option 254. The query report option 262 is operable to search for such data as wire bundle sleeving information or any other type of information that is in the WHI CAD model but not in the text-based data table. Thus, the query report option 262 allows for counting of occurrences of various elements of a wire bundle for various planning purposes, thereby advantageously allowing developers to identify opportunities for additional automation of processes by revealing what types of data elements are widely used as opposed to which types of elements are more rarely used.

Using the view latest file for NWS option 264, a user can analyze the results of the process after the WHA has been generated. The view latest file for NWS option 264 allows a user to verify data integrity in the event that anomalies should arise during the extraction process or at a later time.

The view latest file by NWS option 266 allows a user to view information input to the WHA extraction process. In this case, the wiring fabrication system providing information to the WHA extraction process is NWS (New Wiring System), although embodiments of the present invention can interface with other wiring fabrication systems. Flawed information can cause the extraction process to fail. Allowing a user to review the data provided provides the user with the chance to rectify the problem "upstream" of the extraction process to enable successful extraction of the WHA model.

The reidentify WHA ID option 268 permits the user to redesignate the WHA for systems where a unique WHA identifier is assigned. It will be appreciated that reidentification is to be applied upstream of the extraction process to facilitate successful extraction of the model.

The list point identifiers option 270 displays all the point identifiers used in a WHI model to allow review: and cross-check The list point identifiers option 270 is comparable to the query report option 262 except that the list point identifiers option 270 reports data for each and every CAD point element. The query report options data 262 provides information only according to the search specified.

The view modify parameters option 272 allows a user to specify the form of the final report. A user can identify change numbers that authorized work on a particular design, reverify trapping or association tolerances, identify the printer to which a report is sent, and similar formatting options. Finally, an end reports & utilities menu option 274 is provided.

Embodiments of the present invention provide numerous advantages. First, because data used in the WHA modeling process is extracted from WHI models, data need not manually be rekeyed. Not having to rekey the data not only saves time, but eliminates errors. Second, because the data is extracted from WHI models, as the WHI models are changed current data is available for creation of the WHA model. Third, with the WHI model data and the overall system information entered, embodiments of the present invention can collate data for generation of WHA models without a potentially time-consuming process of manual collection and calculation, thereby saving time and avoiding possible human errors.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for designing a wiring harness assembly for a system, the method comprising:

selecting an overall system and parameters for which a wiring harness assembly is desired;

automatically extracting wiring data from wiring harness installation models for a plurality of zones of the system;

reconciling wiring connections between the wiring harness installation models, wherein the reconciling of wiring connections comprises interrogating connections for points with wire harness assemblies that are greater than a predefined trapping distance from a harness centerline element; and automatically generating at least one wiring harness assembly model from the wiring data extracted from the wiring harness installation models.

2. The method of claim 1, wherein the wiring harness installation models are created in a computer aided three-dimensional interactive application.

3. The method of claim 2, wherein the computer aided three-dimensional interactive application generates the wiring data in a standard data format.

4. The method of claim 3, wherein the standard data format includes one of standard for the exchange of product model data and initial graphics exchange specification.

5. The method of claim 1, wherein the reconciling of wiring connections is performed automatically by correlating data extracted from wiring harness installation models.

6. The method of claim 5, wherein the reconciling of wiring connections is performed according to a modifiable reconciling parameter list.

7. The method of claim 6, wherein the reconciling parameter list at least one of a trapping tolerance, an association tolerance, and a separate layers bundling option.

8. The method of claim 5, wherein the reconciling of wiring connections that are not automatically reconcilable is performed manually by a user.

9. A method for designing a wiring harness assembly for a system, the method comprising:

selecting an overall system and parameters for which a wiring harness assembly is desired;

automatically extracting wiring data from wiring harness installation models for a plurality of zones of the system;

reconciling wiring connections between the wiring harness installation models, wherein the reconciling of wiring connections further comprises interrogating connections for at least one of curves that are not broken at the junction of at least three curves, wire harness centerline curves which are exact duplicates of each other, wire harness centerline lines which are exact duplicates of each other, and connections that are shorter than a predefined length; and automatically generating at least one wiring harness assembly model from the wiring data extracted from the wiring harness installation models.

10. The method of claim 1, wherein the generating of the wiring harness assembly model includes generating a two-dimensional model of the wiring harness assembly.

11. The method of claim 1, wherein the generating of the wiring harness assembly model is performed according to a generating parameter list customizable by a user.

12. The method of claim 11, wherein the generating parameter list includes at least one of a create local data table option, a generate bundle request data file, and an extract bundles option.

13. The method of claim 1, further comprising generating a searchable processing report describing the generating of the at least one wiring harness assembly model.

14. The method of claim 13, wherein the generating of the searchable processing report model is performed according to a report parameter list customizable by a user.

15. A method for designing a wiring harness assembly for a system, the method comprising:

selecting an overall system and parameters for which a wiring harness assembly is desired;

automatically extracting wiring data from wiring harness installation models for a plurality of zones of the system;

automatically reconciling wiring connections between the wiring harness installation models by automatically correlating data extracted from wiring harness installation models, wherein the reconciling of wiring connections comprises interrogating connections for points with wire harness assemblies that are greater than a predefined trapping distance from a harness centerline element;

eliciting user input to manually reconcile connections not automatically reconcilable; and automatically generating at least one two-dimensional wiring harness assembly model from the wiring data extracted from the wiring harness installation models.

16. The method of claim 15, wherein the wiring harness installation models are created in a computer aided three-dimensional interactive application.

17. The method of claim 16, wherein the computer aided three-dimensional interactive application generates the wiring data in a standard data format.

18. The method of claim 17, wherein the standard data format includes one of standard for the exchange of product model data and initial graphics exchange specification.

19. The method of claim 15, wherein the reconciling of wiring connections is performed according to a modifiable reconciling parameter list.

20. The method of claim 19, wherein the reconciling parameter list includes at least one of a trapping tolerance, an association tolerance, and a separate layers bundling option.

21. The method of claim 15, wherein the generating of the wiring harness assembly model includes generating a two-dimensional model of the wiring harness assembly.

22. The method of claim 15, wherein the generating of the wiring harness assembly model is performed according to a generating parameter list customizable by a user.

23. The method of claim 22, wherein the generating parameter list includes at least one of a create local data table option, a generate bundle request data file, and an extract bundles option.

24. The method of claim 15, further comprising generating a searchable processing report describing the generating of the at least one wiring harness assembly model.

25. The method of claim 24, wherein the generating of the searchable processing report model is performed according to a report parameter list customizable by a user.

26. A method for designing a wiring harness assembly for a system, the method comprising:

selecting an overall system and parameters for which a wiring harness assembly is desired;

automatically extracting wiring data from wiring harness installation models for a plurality of zones of the system;

automatically reconciling wiring connections between the wiring harness installation models by automatically correlating data extracted from wiring harness installation models, wherein the reconciling of wiring connections further comprises interrogating connections for at least one of curves that are not broken at the junction of at least three curves, wire harness centerline curves which are exact duplicates of each other, wire harness centerline lines which are exact duplicates of each other, and connections that are shorter than a predefined length;

eliciting user input to manually reconcile connections not automatically reconcilable; and automatically generating at least one two-dimensional wiring harness assembly model from the wiring data extracted from the wiring harness installation models.

27. A computer-readable medium having a computer program code embodied thereon for causing a computer to design a wiring harness assembly for a system, the computer-readable medium comprising:

first computer program code means for selecting an overall system and parameters for which a wiring harness assembly is desired;

second computer program code means for automatically extracting wiring data from wiring harness installation models for a plurality of zones of the system;

third computer program code means for reconciling wiring connections between the wiring harness installation models, wherein the reconciling of wiring connections comprises interrogating connections for points with wire harness assemblies that are greater than a predefined trapping distance from a harness centerline element; and fourth computer program code means for automatically generating at least one wiring harness assembly model from the wiring data extracted from the wiring harness installation models.

28. The computer-readable medium of claim 27, wherein the wiring harness installation models are created in a computer aided three-dimensional interactive application.

29. The computer-readable medium of claim 28, wherein the computer aided three-dimensional interactive application generates the wiring data in a standard data format.

30. The computer-readable medium of claim 29, wherein the standard data format includes one of standard for the exchange of product model data and initial graphics exchange specification.

31. The computer-readable medium of claim 27, further comprising fourth computer program code means for automatically reconciling the wiring connections by correlating data extracted from wiring harness installation models.

32. The computer-readable medium of claim 31, wherein the reconciling of wiring connections is performed according to a modifiable reconciling parameter list.

33. The computer-readable medium of claim 32, wherein the reconciling parameter list includes at least one of a trapping tolerance, an association tolerance, and a separate layers bundling option.

34. The computer-readable medium of claim 31, further comprising fifth computer program code means for eliciting input from a user for manually reconciling of wiring connections that are not automatically reconcilable.

35. The computer-readable medium of claim 27, wherein the generating of the wiring harness assembly model includes generating a two-dimensional model of the wiring harness assembly.

36. The computer-readable medium of claim 27, wherein the generating of the wiring harness assembly model is performed according to a generating parameter list customizable by a user.

37. The computer-readable medium of claim 36, wherein the generating parameter list includes at least one of a create local data table option, a generate bundle request data file, and an extract bundles option.

38. The computer-readable medium of claim 27, further comprising sixth computer program code means for generating a searchable processing report describing the generating of the at least one wiring harness assembly model.

39. The computer-readable medium of claim 38, wherein the generating of the searchable processing report model is performed according to a report parameter list customizable by a user.

40. A computer-readable medium having a computer program code embodied thereon for causing a computer to design a wiring harness assembly for a system, the computer-readable medium comprising:

first computer program code means for selecting an overall system and parameters for which a wiring harness assembly is desired:

second computer program code means for automatically extracting wiring data from wiring harness installation models for a plurality of zones of the system;

third computer program code means for reconciling wiring connections between the wiring harness installation models, wherein the reconciling of wiring connections further comprises interrogating connections for at least one of curves that are not broken at the junction of at least three curves, wire harness centerline curves which are exact duplicates of each other, wire harness centerline lines which are exact duplicates of each other, and connections that are shorter than a predefined length; and fourth computer program code means for automatically generating at least one wiring harness assembly model from the wiring data extracted from the wiring harness installation models.

41. A computer-readable medium having a computer program code embodied theron for causing a computer to design a wiring harness assembly fpr a system, the computer-readable medium comprising:

first computer program code means for selecting an overall system and parameters for which a wiring harness assembly is desired;

second computer program code means for automatically extracting wiring data from wiring harness installation models for a plurality of zones of the system;

third computer program code means for automatically reconciling wiring connections between the wiring harness installation models by automatically correlating data extracted from wiring harness installation models, wherein the reconciling of wiring connections further comprises interrogating connections for points with wire harness assemblies that are greater than a predefined trapping distance from a harness centerline element;

fourth computer program code means for eliciting user input to manually reconcile connections not automatically reconcilable; and fifth computer program code means for automatically generating at least one two-dimensional wiring harness assembly model from the wiring data extracted from the wiring harness installation models.

42. The computer-readable medium of claim 41, wherein the wiring harness installation models are created in a computer aided three-dimensional interactive application.

43. The computer-readable medium of claim 42, wherein the computer aided three-dimensional interactive application generates the wiring data in a standard data format.

44. The computer-readable medium of claim 43, wherein the standard data format includes one of standard for the exchange of product model data and initial graphics exchange specification.

45. The computer-readable medium of claim 41, wherein the reconciling of wiring connections is performed according to a modifiable reconciling -parameter list.

46. The computer-readable medium of claim 45, wherein the reconciling parameter list includes at least one of a trapping tolerance, an association tolerance, and a separate layers bundling option.

47. The computer-readable medium of claim 41, wherein the generating of the wiring harness assembly model includes generating a two-dimensional model of the wiring harness assembly.

48. The computer-readable medium of claim 41, wherein the generating of the wiring harness assembly model is performed according to a generating parameter list customizable by a user.

49. The computer-readable medium of claim 48, wherein the generating parameter list includes at least one of a create local data table option, a generate bundle request data file, and an extract bundles option.

50. The computer-readable medium of claim 41, further comprising fifth computer program code means for generating a searchable processing report describing the generating of the at least one wiring harness assembly model.

51. The computer-readable medium of claim 50, wherein the generating of the searchable processing report model is performed according to a report parameter list customizable by a user.

52. A computer-readable medium having a computer program code embodied thereon for causing a computer to design a wiring harness assembly for a system, the computer-readable medium comprising:

first computer program code means for selecting an overall system and parameters for which a wiring harness assembly is desired;

second computer program code means for automatically extracting wiring data from wiring harness installation models for a plurality of zones of the system;

third computer program code means for automatically reconciling wiring connections between the wiring harness installation models by automatically correlating data extracted from wiring harness installation models, wherein the reconciling of wiring connections further comprises interrogating connections for at least one of curves that are not broken at the junction of at least three curves, wire harness centerline curves which are exact duplicates of each other, wire harness centerline lines which are exact duplicates of each other, and connections that are shorter than a predefined length;

fourth computer program code means for eliciting user input to manually reconcile connections not automatically reconcilable; and fifth computer program code means for automatically generating at least one two-dimensional wiring harness assembly model from the wiring data extracted from the wiring harness installation models.

* * * * *